(12) United States Patent
Yamaguchi et al.

(10) Patent No.: US 10,540,969 B2
(45) Date of Patent: Jan. 21, 2020

(54) VOICE OPERATING SYSTEM, SERVER DEVICE, ON-VEHICLE DEVICE, AND VOICE OPERATING METHOD

(71) Applicant: Clarion Co., Ltd., Saitama-shi, Saitama (JP)

(72) Inventors: Takashi Yamaguchi, Saitama (JP); Yasushi Nagai, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 99 days.

(21) Appl. No.: 15/745,556

(22) PCT Filed: Jul. 21, 2016

(86) PCT No.: PCT/JP2016/071435
§ 371 (c)(1),
(2) Date: Jan. 17, 2018

(87) PCT Pub. No.: WO2017/026239
PCT Pub. Date: Feb. 16, 2017

(65) Prior Publication Data
US 2018/0211662 A1 Jul. 26, 2018

(30) Foreign Application Priority Data

Aug. 10, 2015 (JP) .................................. 2015-158152

(51) Int. Cl.
*G10L 15/22* (2006.01)
*G10L 15/30* (2013.01)
(Continued)

(52) U.S. Cl.
CPC ................ *G10L 15/22* (2013.01); *G06F 3/16* (2013.01); *G10L 15/00* (2013.01); *G10L 15/265* (2013.01);
(Continued)

(58) Field of Classification Search
CPC .... G10L 15/30; G10L 15/22; G10L 2015/225
See application file for complete search history.

(56) References Cited

U.S. PATENT DOCUMENTS 5,577,164 A 11/1996 Kaneko et al.
6,336,091 B1 * 1/2002 Polikaitis ................ G10L 25/78
704/233

(Continued)

FOREIGN PATENT DOCUMENTS

JP 7-219588 A 8/1995
JP 9-292895 A 11/1997
(Continued)

OTHER PUBLICATIONS

International Search Report (PCT/ISA/210) issued in PCT Application No. PCT/JP2016/071435 dated Sep. 13, 2016 with English translation (4 pages).

(Continued)

*Primary Examiner* — Brian L Albertalli
(74) *Attorney, Agent, or Firm* — Crowell & Moring LLP

(57) ABSTRACT

A purpose of the present invention is to provide a technique for easily performing accurate voice recognition. A voice operating system includes an on-vehicle device and a server device, in which the on-vehicle device includes a voice-input accepting unit, a vehicle-environment-information management unit, and an output control unit that transmits input information and vehicle-environment information to the server device, then outputs an execution task candidate received from the server device together with an estimated misrecognition factor, and transmits, when accepting permission, an instruction to execute the execution task candidate, and the server device includes a voice-data processing unit that converts the input information into a text, a task estimation unit that specifies the execution task candidate, reliability and the estimated misrecognition factor, a user- (Continued)

confirmation-necessity determination unit that transmits, when the reliability is less than a predetermined value, the estimated factor and the execution task candidate, and a processing unit.

8 Claims, 10 Drawing Sheets

(51) Int. Cl.
G10L 15/00 (2013.01)
G06F 3/16 (2006.01)
G10L 15/26 (2006.01)

(52) U.S. Cl.
CPC ........ *G10L 15/30* (2013.01); *G10L 2015/223* (2013.01); *G10L 2015/228* (2013.01)

(56) References Cited

U.S. PATENT DOCUMENTS

| | | | |
|---|---|---|---|
| 8,438,023 B1* | 5/2013 | Hamilton | G10L 15/22 704/231 |
| 2003/0220797 A1 | 11/2003 | Ito | |
| 2006/0058947 A1 | 3/2006 | Schalk | |
| 2007/0033055 A1* | 2/2007 | Tanaka | G10L 15/22 704/275 |
| 2007/0136069 A1* | 6/2007 | Veliu | G10L 15/065 704/270 |
| 2008/0065371 A1* | 3/2008 | Nakano | G10L 15/22 704/9 |
| 2008/0126100 A1* | 5/2008 | Grost | G10L 15/08 704/275 |
| 2008/0140400 A1* | 6/2008 | Blass | G10L 15/22 704/246 |
| 2009/0150156 A1 | 6/2009 | Kennewick et al. | |
| 2009/0222271 A1 | 9/2009 | Katzer | |
| 2014/0067392 A1* | 3/2014 | Burke | G10L 15/22 704/236 |
| 2014/0120892 A1* | 5/2014 | Martin | G10L 15/22 455/418 |
| 2015/0187350 A1 | 7/2015 | Kim et al. | |
| 2015/0243287 A1* | 8/2015 | Nakano | G10L 15/30 704/246 |

FOREIGN PATENT DOCUMENTS

| | | |
|---|---|---|
| JP | 11-352995 A | 12/1999 |
| JP | 2000-338991 A | 12/2000 |
| JP | 2004-325635 A | 11/2004 |
| JP | 2005-181386 A | 7/2005 |
| JP | 2007-156076 A | 6/2007 |
| JP | 2008-256802 A | 10/2008 |
| JP | 2010-186126 A | 8/2010 |
| WO | WO 2011/163538 A1 | 12/2011 |

OTHER PUBLICATIONS

Japanese-language Written Opinion (PCT/ISA/237) issued in PCT Application No. PCT/JP2016/071435 dated Sep. 13, 2016 (5 pages).
Extended European Search Report issued in counterpart European Application No. 16834936.3 dated Apr. 4, 2019 (13 pages).

* cited by examiner

FIG.2
TASK-ESTIMATION-RESULT-HISTORY
STORAGE UNIT 121

| UTTERANCE IDENTIFIER | ESTIMATED TASK | RELIABILITY | MISRECOGNITION FLAG |
|---|---|---|---|
| 1 | ROUTE SEARCH | CCC | Y |
| 1 | FACILITY SEARCH | DDD | N |
| 1 | BYROAD SEARCH | EEE | N |
| ... | ... | ... | ... |

121A / 121B / 121C / 121D

TASK STORAGE UNIT 221

| TASK IDENTIFIER | EXECUTION TASK | START KEYWORD |
|---|---|---|
| T1 | ROUTE SEARCH | ROUTE SEARCH, WANT TO GO, ROUTE, WHICH ROAD··· |
| T2 | FACILITY SEARCH | FACILITY NAME, FACILITY GENRE··· |
| T3 | MUSIC REPRODUCTION | MUSIC, SONG, BGM, SONG TITLE··· |
| ··· | ··· | ··· |

VOICE OPERATING SYSTEM, SERVER DEVICE, ON-VEHICLE DEVICE, AND VOICE OPERATING METHOD

TECHNICAL FIELD

The present invention relates to techniques of a voice operating system, a server device, an on-vehicle device, and a voice operating method. The present invention claims priority from Japanese Patent Application No. 2015-158152 filed on Aug. 10, 2015, and for designated countries where incorporation by reference of the literature is permitted, the content described in the application is incorporated herein by reference.

BACKGROUND ART

Conventionally, Patent Literature 1 discloses a technique about a voice interactive processing device that includes a voice understanding unit that outputs a meaning item candidate and its likelihood by performing voice recognition processing and meaning analytic processing for an input voice, a reliability calculating unit that calculates the reliability of a meaning item from the meaning item candidate and its likelihood, a correction parameter storage unit that stores a correction parameter for correcting the reliability of the meaning item, a reliability correcting unit that calculates correction reliability of the meaning item from the reliability and the correction parameter, an interactive management unit that determines, using the correction reliability, whether there is a need to confirm with a user whether each input meaning item is correct or incorrect, outputs a response sentence to the user, and writes interaction with the user as interaction history data in an interaction history storage unit, and a correction parameter adjustment unit that updates the correction parameter stored in the correction parameter storage unit using the interaction history data.

CITATION LIST

Patent Literature

Patent Literature 1: JP 2005-181386 A

SUMMARY OF INVENTION

Technical Problem

With a technique as described above, a user can re-utter to correct a voice recognition result, but has no alternative but to repeatedly utter until the voice is recognized correctly, which has not contributed to a user's convenience.

A purpose of the present invention is to provide a technique for easily performing accurate voice recognition.

Solution to Problem

The present invention includes a plurality of means for solving at least a part of the above problem, and an example thereof is as follows. In order to solve the above problem, a voice operating system according to the present invention is a voice operating system including an on-vehicle device and a server device capable of communicating with the on-vehicle device, in which the on-vehicle device includes a voice-input accepting unit that accepts input information in voice, a vehicle-environment-information management unit that acquires vehicle-environment information specifying an environment of a vehicle provided with the on-vehicle device, and an output control unit that transmits the input information and the vehicle-environment information to the server device, then outputs an execution task candidate received from the server device together with an estimated misrecognition factor of voice recognition, and transmits, when accepting execution permission of the execution task candidate, an instruction to execute the execution task candidate to the server device, and the server device includes a voice-data processing unit that converts, when accepting the input information and the vehicle-environment information from the on-vehicle device, the input information into a character string, a task estimation unit that specifies the execution task candidate corresponding to the character string into which the voice-data processing unit converts the input information, reliability using the input information and the vehicle-environment information, and the estimated misrecognition factor if any, a user-confirmation-necessity determination unit that transmits, when the reliability is less than a predetermined value, the estimated misrecognition factor of the voice recognition and the execution task candidate to the on-vehicle device, and a task processing unit that executes the execution task candidate.

Advantageous Effects of Invention

According to the present invention, it is possible to provide a technique for easily performing accurate voice recognition. Other problems, configurations, and effects other than that described above will be clarified by the description of the embodiments below.

BRIEF DESCRIPTION OF DRAWINGS

FIG. 2 is a diagram showing a data configuration in a task-estimation-result-history storage unit.

DESCRIPTION OF EMBODIMENTS

Hereinafter, a voice operating system to which a first embodiment and a second embodiment according to the present invention are applied will be described with reference to the drawings. FIGS. 1 to 10 do not show all the configurations of the voice operating system, and are drawn by appropriately omitting a part of the configuration for the sake of easy understanding.

Figure 1:
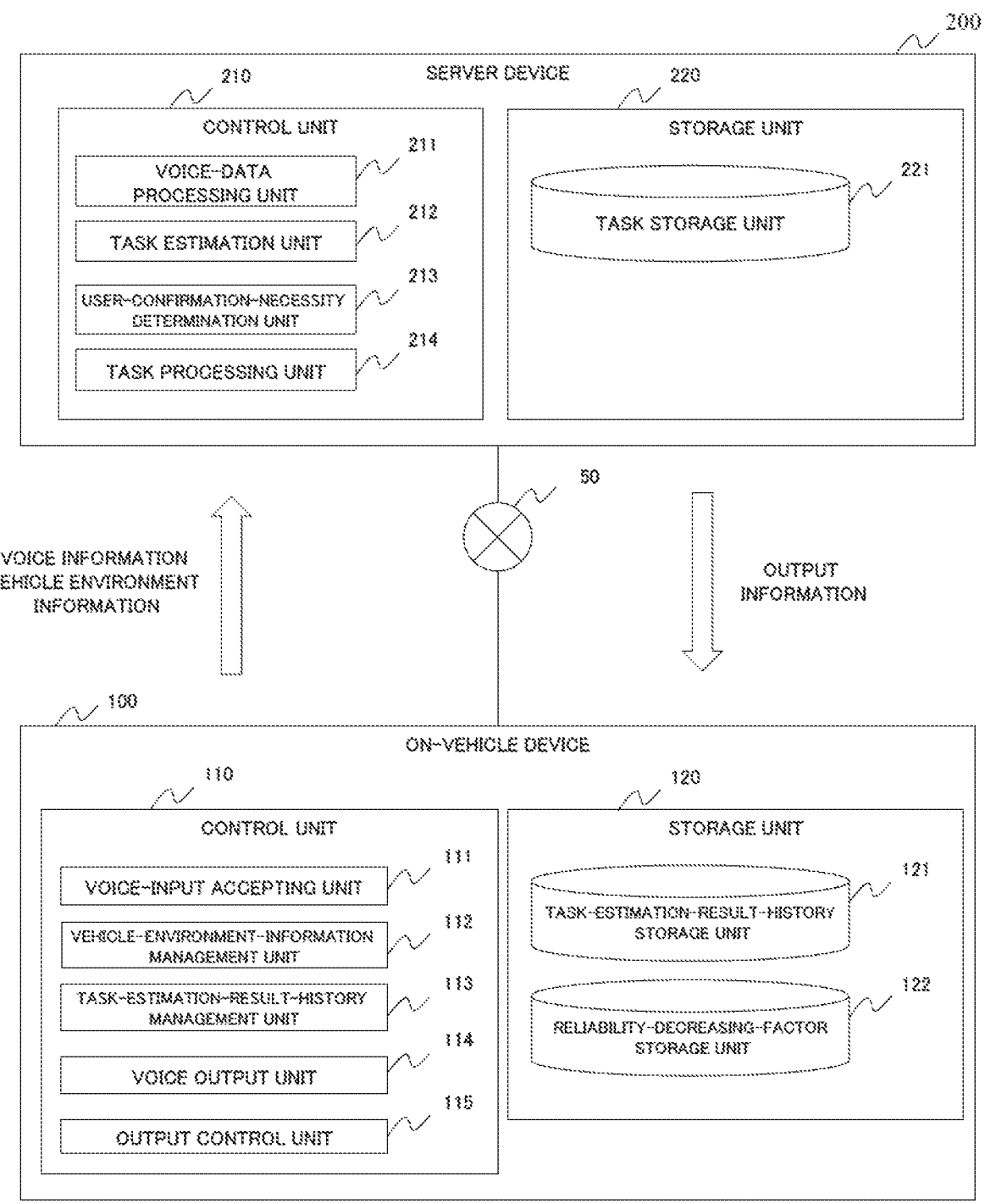
FIG. 1 is a diagram showing a configuration of a voice operating system according to a first embodiment.

FIG. 1 shows a configuration of a voice operating system according to the first embodiment. In the voice operating system according to the first embodiment, an on-vehicle device 100 and a server device 200 are communicably connected via a network 50. The network 50 is preferably a public wireless communication network such as an internet network or a mobile phone network, and may be a closed communication network provided for each predetermined management area. More specifically, the network 50 may be a communication network by any of various communication methods of a wireless network such as the Internet, a local area network (LAN), a wide area network (WAN), or WiFi (Registered Trademark), and a short-range wireless communication such as Bluetooth (Registered Trademark).

The on-vehicle device 100 is an information processing device mounted on a vehicle and capable of performing predetermined communication with other devices mounted on the vehicle. In the present embodiment, the on-vehicle device 100 is a navigation device capable of acquiring current position information, route information, and the like. However, the on-vehicle device 100 to which the present invention is applied is not limited to the on-vehicle device 100 shown in FIG. 1. For example, the on-vehicle device 100 may be any control device incorporated in a moving body. Alternatively, the on-vehicle device 100 may be detachably provided to the vehicle. Alternatively, the on-vehicle device 100 may be a mobile terminal such as a mobile phone device or the like possessed by a driver of the vehicle or an occupant, and may be, for example, a smartphone, a feature phone, a personal digital assistance (PDA), a laptop computer, a tablet terminal, or the like.

The on-vehicle device 100 includes a control unit 110 and a storage unit 120. The control unit 110 includes a voice-input accepting unit 111, a vehicle-environment-information management unit 112, a task-estimation-result-history management unit 113, a voice output unit 114, and an output control unit 115. The storage unit 120 includes a task-estimation-result-history storage unit 121 and a reliability-decreasing-factor storage unit 122.

The voice-input accepting unit 111 accepts voice input from a user. The vehicle-environment-information management unit 112 acquires, holds, and provides predetermined environmental information related to the vehicle on which the on-vehicle device 100 is mounted. Specifically, the vehicle-environment-information includes, for example, outside air temperature, rainfall information, traveling speed, vehicle interior noise level, window opening condition, door opening condition, number of occupants of the vehicle, and type of the road. The task-estimation-result-history management unit 113 manages the history of an execution task candidate obtained as a result of estimation of an execution task candidate requested of the server device 200. Specifically, the task-estimation-result-history management unit 113 manages input and output of information in the task-estimation-result-history storage unit 121 to be described later. The task-estimation-result-history management unit 113 further manages the history of an estimated factor when the reliability of voice recognition of the execution task candidate, which is obtained as a result of estimation of the execution task candidate requested of the server device 200, is equal to or less than a predetermined value, that is, in the case of misrecognition. Specifically, the task-estimation-result-history management unit 113 manages input and output of information in the reliability-decreasing-factor storage unit 122 to be described later.

The voice output unit 114 performs control of outputting voice guidance related to confirmation guidance of the execution task candidate received from the server device 200 or the task execution result in voice.

The output control unit 115 performs control of outputting guidance display related to confirmation guidance of the execution task candidate received from the server device 200 or display of the task execution result as screen information. The output screen includes various screens, and may be a first example 300 of the screen output of task execution processing shown in FIG. 8 or a second example 400 of the screen output of the task execution processing shown in FIG. 9. Each screen example will be described later. After transmitting the voice information and the vehicle-environment information to the server device 200, the output control unit 115 further outputs the execution task candidate received from the server device 200 together with the estimated misrecognition factor of the voice recognition reliability, and transmits an instruction to execute the execution task candidate to the server device 200 when accepting the execution permission of the execution task candidate.

FIG. 2 is a diagram showing a data configuration in the task-estimation-result-history storage unit 121. The task-estimation-result-history storage unit 121 stores the history of an execution task candidate obtained as a result of estimation of an execution task candidate requested of the server device 200. Specifically, the task-estimation-result-history storage unit 121 includes an utterance identifier 121A, an estimated task 121B, reliability 121C, and a misrecognition flag 121D. The utterance identifier 121A is information for identifying voice uttered during a predetermined continuous time. The estimated task 121B is information for specifying an estimated task estimated using the voice specified by the utterance identifier 121A. The reliability 121C is information for specifying the reliability of the estimated task specified by the estimated task 121B. The misrecognition flag 121D is a flag for specifying whether the estimated task specified by the estimated task 121B is incorrect. In the present embodiment, the case in which the misrecognition flag 121D is "Y" indicates that the estimation is incorrect, and the other cases indicate that it has not been confirmed whether the estimation is incorrect.

Figure 3:
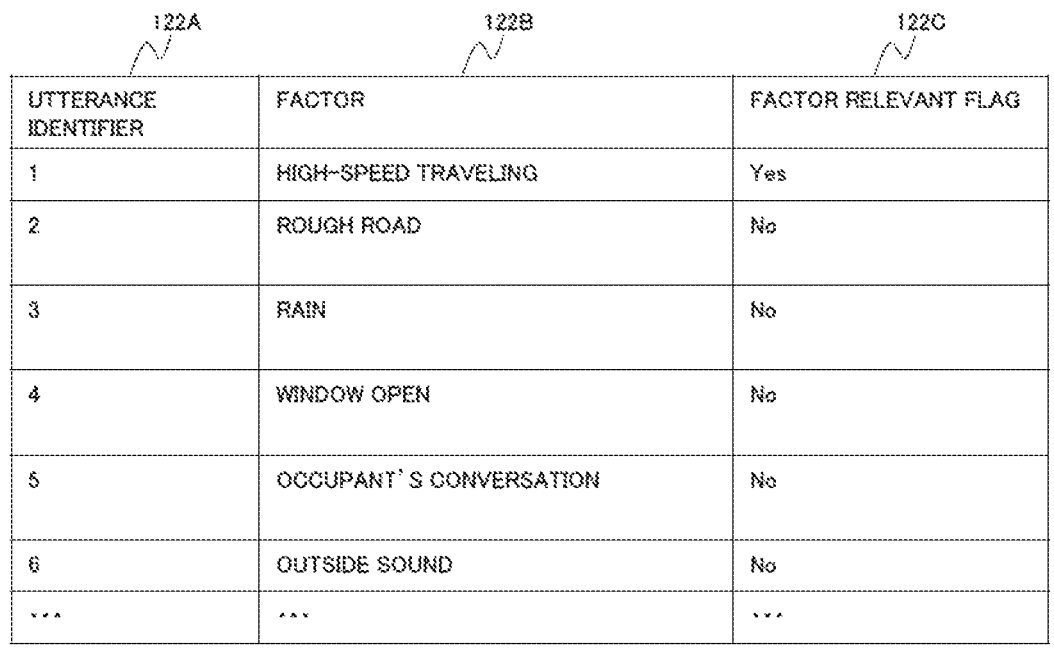
FIG. 3 is a diagram showing a data configuration in a reliability-decreasing-factor storage unit.

FIG. 3 is a diagram showing a data configuration in the reliability-decreasing-factor storage unit 122. The reliability-decreasing-factor storage unit 122 stores a factor that decreases the reliability of the execution task candidate obtained as a result of the estimation of the execution task candidate requested of the server device 200. Specifically, the reliability-decreasing-factor storage unit 122 includes an utterance identifier 122A, a factor 122B, and a factor relevant flag 122C. The utterance identifier 122A is information for identifying voice uttered during a predetermined continuous time. The factor 122B is information for specifying a factor that decreases the reliability of the utterance specified by the utterance identifier 122A. The factor relevant flag 122C is a flag for specifying whether the factor 122B is the factor that decreases the reliability. In the present embodiment, the case in which the factor relevant flag 122C is "Y" indicates that the factor 122B corresponds the factor, and the other cases indicate that it has not been confirmed whether the factor 122B corresponds to the factor.

The server device 200 is an information processing device including a control unit 210 and a storage unit 220. When accepting a request for an estimated task candidate including voice information, or voice information and vehicle-environment information from the on-vehicle device 100, the server device 200 provides information on the estimated task candidate according to the request.

The storage unit 220 of the server device 200 includes a task storage unit 221.

Figure 4:
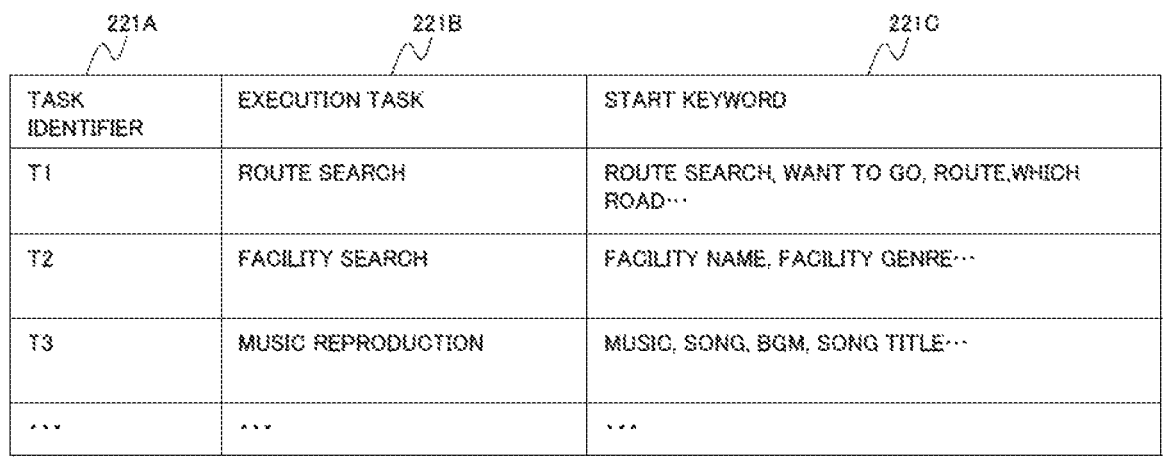
FIG. 4 is a diagram showing a data configuration in a task storage unit.

FIG. 4 is a diagram showing a data configuration in the task storage unit 221. The task storage unit 221 stores a task and a keyword for starting the task. Specifically, the task storage unit 221 includes a task identifier 221A, an execution task 221B, and a start keyword 221C. The task identifier 221A is information for specifying a task. Note that, a task is a processing unit that cannot be divided, and is a unit of processing such as route search, facility search, and music reproduction.

The execution task 221B is information for specifying the entry point of the entity of the task specified by the task identifier 221A. In other words, specifically, the execution task 221B may be a start address of a program of a task or a uniform resource identifier (URI).

The start keyword 221C is one or more keywords that are triggers for starting the task specified by the task identifier 221A. For example, the keywords for starting a route search task are stored in the start keyword 221C as predetermined keywords such as "route search", "want to go", "route", and "which road". In addition, the keywords for starting a facility search task may be the name of a facility itself, or designation of the genre of a facility (convenience store, restaurant, station, and the like).

The control unit 210 of the server device 200 includes a voice-data processing unit 211, a task estimation unit 212, a user-confirmation-necessity determination unit 213, and a task processing unit 214.

The voice-data processing unit 211 converts the input voice data into the character string of the utterance content. The voice-data processing unit 211 further estimates the magnitude of the signal component (utterance sound pressure) and the noise component (noise sound pressure) of the input voice data. The voice-data processing unit 211 further estimates the factor of the noise based on the characteristics of the waveform of the noise component by a method of similarity comparison of patterns or the like.

The task estimation unit 212 estimates a task corresponding to the utterance intention from the input information, and calculates the reliability thereof. The task estimation unit 212 further extracts a factor estimated to decrease the reliability. In the present embodiment, factors determining the reliability are assumed to be the S/N ratio of the voice input (the ratio of the utterance sound pressure and the noise sound pressure), the traveling speed of the vehicle, and the reliability-decreasing-factor ratio of the vehicle-environment information. The S/N ratio is considered to be a reliability decreasing factor, if the S/N ratio is equal to or less than a predetermined threshold value. The traveling speed of the vehicle is also considered to be a reliability decreasing factor if the traveling speed exceeds a predetermined speed. The reliability-decreasing-factor ratio of the vehicle-environment information is considered to further decrease the reliability as the ratio of the number of corresponding items in the predetermined vehicle-environment information is higher. However, the method is not limited to the reliability determination method in the present embodiment, and the reliability may be specified using other methods or elements. In addition, the reliability decreasing factor may be estimated using other methods or elements.

When the reliability of the estimated task candidate does not reach a predetermined threshold value, the user-confirmation-necessity determination unit 213 determines that there is a need to confirm with the utterer whether the estimated task candidate is correct. When there is a need for confirmation, the user-confirmation-necessity determination unit 213 transmits, to the on-vehicle device 100, screen information of output such as the screen 300 of the task execution processing shown in FIG. 8 or the screen 400 of the task execution processing shown in FIG. 9, which are to be described later, and voice information for guidance, and accepts input. In addition, the user-confirmation-necessity determination unit 213 transmits, to the on-vehicle device 100, the factor that decreases the reliability together with the guidance of the measures for avoiding decreasing the reliability.

The task processing unit 214 executes a task. Specifically, the task processing unit 214 compares an estimated task in which the reliability is equal to or higher than a predetermined value or an estimated task candidate in which the reliability is less than the predetermined value but which is instructed to be executed by the user with the start keyword 221C of the task storage unit 221 to specify and execute the execution task 221B. The task processing unit 214 transmits the output information on the executed task to the on-vehicle device 100.

Figure 5:
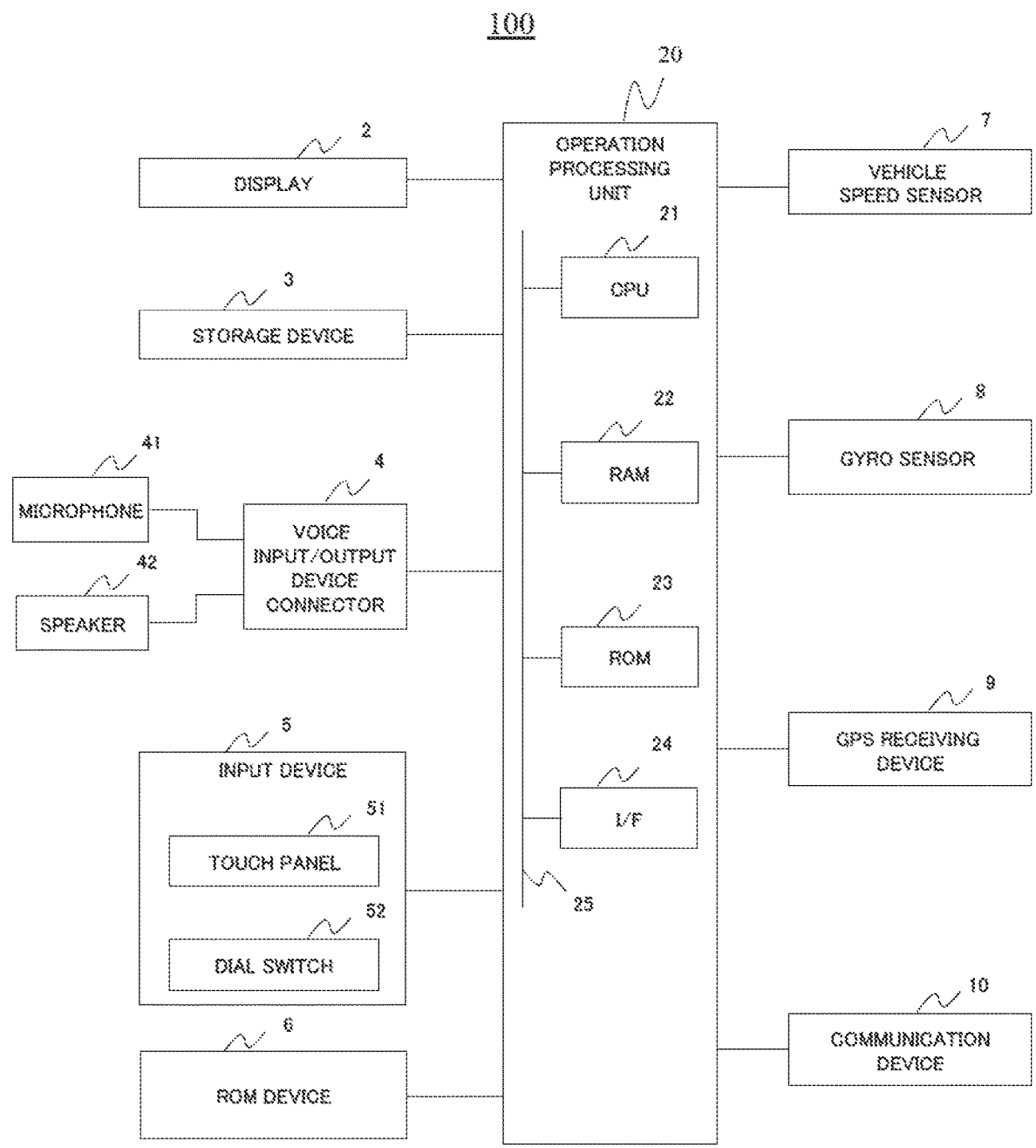
FIG. 5 is a diagram showing a hardware configuration of an on-vehicle device according to the first embodiment.

FIG. 5 is a diagram showing a hardware configuration of the on-vehicle device 100. The on-vehicle device 100 includes an operation processing unit 20, a display 2, a storage device 3, a voice input/output device connector 4 (including a microphone 41 as a voice input device and a speaker 42 as a voice output device), an input device 5 (including a touch panel 51 and a dial switch 52 as a touch input device), a read only memory (ROM) device 6, a vehicle speed sensor 7, a gyro sensor 8, a global positioning system (GPS) receiving device 9, and a communication device 10.

The operation processing unit 20 is a central unit that performs various types of processing. For example, the operation processing unit 20 calculates the current position based on information output from the various sensors 7 and 8, the GPS receiving device 9, the communication device 10, and the like. The operation processing unit 20 further reads, from the storage device 3 or the ROM device 6, the map data necessary for display based on the obtained information on the current position.

In addition, the operation processing unit 20 graphically develops the read map data, superimposes a mark indicating the current position thereon, and displays it on the display 2. The operation processing unit 20 further searches for a recommended route that is the optimum route connecting the current position or the departure point instructed by the user with the destination (or a stopover or stop-off place) using the map data or the like stored in the storage device 3 or the ROM device 6. The operation processing unit 20 further guides the user using the speaker 42 and the display 2. The operation processing unit 20 further performs following processing, which is to be described later, executed by the functional units of the control unit 110 of the on-vehicle device 100, that is, the voice-input accepting unit 111, the vehicle-environment-information management unit 112, the task-estimation-result-history management unit 113, the voice output unit 114, and the output control unit 115.

The operation processing unit 20 of the on-vehicle device 100 has a configuration in which all the devices are connected by a bus 25. The operation processing unit 20 includes a central processing unit (CPU) 21 that executes various types of processing such as numerical calculation and control of the devices, a random access memory (RAM) 22 that stores map data, operation data, and the like read from the storage device 3, a ROM 23 that stores programs and data, and an interface (I/F) 24 that connects various types of hardware to the operation processing unit 20.

The display 2 is a unit for displaying graphics information generated by the operation processing unit 20 or the like.

The display 2 is constituted by a display device such as a liquid crystal display or an organic electro luminescence (EL) display.

The storage device 3 is constituted by at least a readable/writable storage medium such as a hard disk drive (HDD), a solid state drive (SSD), or a nonvolatile memory card.

The storage medium stores map information that is map data necessary for an ordinary route searching device (including link data of links constituting roads on the map).

The voice input/output device connector 4 connects to the microphone 41 as a voice input device and to the speaker 42 as a voice output device to enable them to use. The microphone 41 acquires sound outside the on-vehicle device 100 such as a voice uttered by a user or other occupants, and an external sound collected at a predetermined position of the vehicle.

The speaker 42 outputs a message generated by the operation processing unit 20 to the user as voice. The microphone 41 and the speaker 42 are separately disposed in predetermined parts of the vehicle. However, the microphone 41 and the speaker 42 may be housed in a casing. The on-vehicle device 100 can include a plurality of microphones 41 and a plurality of speakers 42.

The input device 5 is a device that accepts an instruction from a user via an operation by the user's hand. The input device 5 includes a touch panel 51, a dial switch 52, and other hard switches (not shown) such as a scroll key, and a scale change key. The input device 5 further includes a remote controller capable of remotely giving an operation instruction to the on-vehicle device 100. The remote controller includes a dial switch, a scroll key, and a scale change key, and can transmit information obtained by operating a key or a switch to the on-vehicle device 100.

The touch panel 51 is provided on the display surface side of the display 2, and the display screen can be seen through. The touch panel 51 specifies a touch position corresponding to the XY coordinates of the image displayed on the display 2, converts the touch position into the coordinates, and outputs the coordinates. The touch panel 51 is constituted by a pressure sensitive type or electrostatic type input detecting element and the like. Note that, the touch panel 51 may implement multi-touch capable of simultaneously detecting a plurality of touch positions.

The dial switch 52 is configured to be rotatable in clockwise and counterclockwise directions, generates a pulse signal every rotation at a predetermined angle, and outputs the signal to the operation processing unit 20. The operation processing unit 20 calculates the rotation angle from the number of pulse signals.

The ROM device 6 is constituted by at least a readable storage medium such as a ROM that is a CD-ROM, a DVD-ROM, or the like, or an integrated circuit (IC) card. This storage medium stores, for example, moving image data, voice data, and the like.

The vehicle speed sensor 7, the gyro sensor 8 and the GPS receiving device 9 are used in order for the on-vehicle device 100 to detect the current position (for example, the position of the vehicle). The vehicle speed sensor 7 is a sensor that outputs a value used for calculating the vehicle speed. The gyro sensor 8 is constituted by an optical fiber gyro, a vibration gyro, or the like, and detects the angular speed based on the rotation of a moving body. The GPS receiving device 9 measures the current position, the traveling speed, and the traveling direction of a moving body by receiving signals from GPS satellites and measuring the distances between the moving body and three or more GPS satellites and the changing rates of the distances.

The communication device 10 starts, continues, and ends communication between the server device 200 and a communicable access control device. The communication device 10 connects to the access control device by various communication methods of a wireless network such as the Internet, a LAN, a WAN, or WiFi (Registered Trademark), and a short-range wireless communication such as Bluetooth (Registered Trademark). The communication device 10 further attempts to discover and connect an access control device periodically or at a predetermined timing, and establishes communication with the connectable access control device.

The functional units of the control unit 110 of the on-vehicle device 100 described above, that is, the voice-input accepting unit 111, the vehicle-environment-information management unit 112, the task-estimation-result-history management unit 113, the voice output unit 114, and the output control unit 115 are configured by loading and executing predetermined programs by the CPU 21. Thus, the RAM 22 stores programs for performing processing of the functional units.

In addition, the constituent elements described above are the classified configurations of the on-vehicle device 100 according to each main processing content for the sake of easy understanding. Accordingly, the present invention is not limited by the method of classifying the constituent elements and the names thereof. The configuration of the on-vehicle device 100 can be classified into more constituent elements according to the processing content. In addition, one constituent element can be classified so as to further perform other types of processing.

Furthermore, each functional unit may be implemented not only by the CPU but also by other hardware (ASIC, GPU, or the like). In addition, the processing of each functional unit may be executed by one piece of hardware or by a plurality of pieces of hardware.

Figure 6:
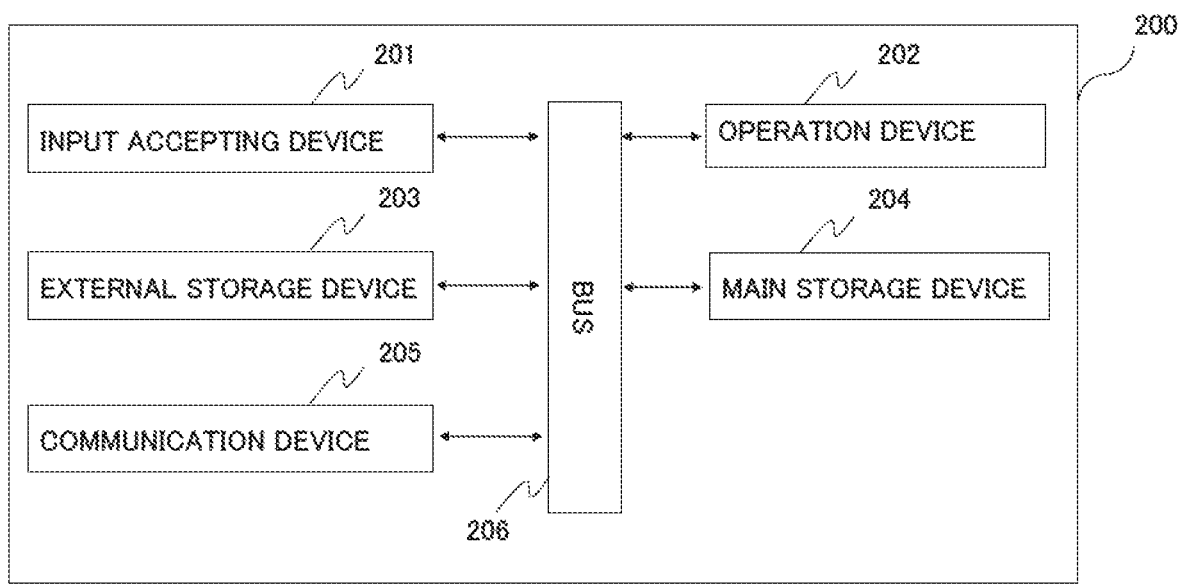
FIG. 6 is a diagram showing a hardware configuration of a server device according to the first embodiment.

FIG. 6 is a diagram showing a hardware configuration of the server device 200. The server device 200 includes an input accepting device 201, an operation device 202, an external storage device 203, a main storage device 204, a communication device 205, and a bus 206 that connects them.

The functional units of the control unit 210, that is, the voice-data processing unit 211, the task estimation unit 212, the user-confirmation-necessity determination unit 213, and the task processing unit 214 are implemented by loading and executing predetermined programs by the operation device 202. Thus, the main storage device 204 or the external storage device 203 stores programs for performing processing of the functional units.

Note that, the constituent elements described above are the classified configurations of the server device 200 according to each main processing content for the sake of easy understanding. Accordingly, the present invention is not limited by the method of classifying the constituent elements and the names thereof. The configuration of the server device 200 can be classified into more constituent elements according to the processing content. In addition, one constituent element can be classified so as to further perform other types of processing.

Furthermore, each functional unit may be implemented not only by the CPU but also by hardware (ASIC, GPU, or the like). In addition, the processing of each functional unit may be executed by one piece of hardware or by a plurality of pieces of hardware.

[Explanation of Operation]

Next, the operation of the task execution processing executed by the on-vehicle device 100 and the server device 200 will be described.

Figure 7:
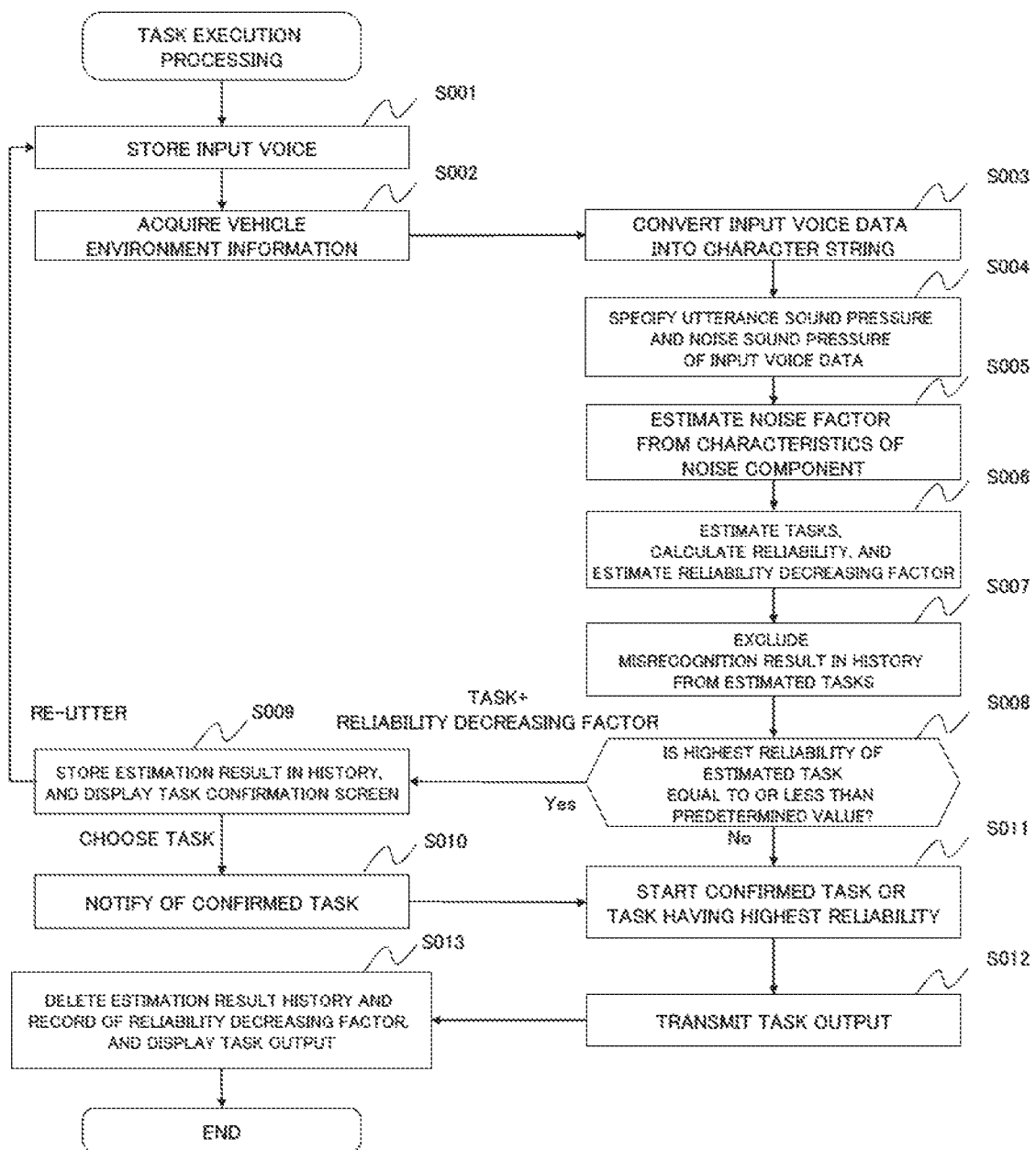
FIG. 7 is a diagram showing a procedure of task execution processing.

FIG. 7 is a diagram showing a procedure of the task execution processing. The task execution processing is started in response to voice input from the user.

First, the voice-input accepting unit 111 of the on-vehicle device 100 accepts the input voice, converts it into digital information, and stores it (step S001).

Then, the vehicle-environment-information management unit 112 acquires vehicle-environment information (step S002). Specifically, the vehicle-environment-information management unit 112 acquires the vehicle speed with the vehicle speed sensor 7 and the rotation angle with the gyro sensor 8. The vehicle-environment-information management unit 112 further acquires acceleration of a plurality of axes with an acceleration sensor (not shown) and position information with the GPS receiving device 9. In addition, the vehicle-environment-information management unit 112 acquires the rainfall amount with a rainfall sensor (not shown) and the sound inside or outside the vehicle with the microphone 41. The vehicle-environment-information management unit 112 further acquires the window opening/closing condition of the vehicle from another device or the like connected to the on-vehicle network such as a controller area network (CAN) (not shown). Then, the vehicle-environment-information management unit 112 adds the acquired information to the voice information as the vehicle-environment information, and transmits the information to the server device 200.

Then, the voice-data processing unit 211 of the server device 200 converts the input voice information into a character string (step S003). Specifically, the voice-data processing unit 211 picks up words from the input voice by a predetermined algorithm, recognizes the words, and converts the words into a character string.

Then, the voice-data processing unit 211 specifies the utterance sound pressure and the noise sound pressure of the input voice data (step S004). Specifically, the voice-data processing unit 211 estimates the magnitude of the signal component (utterance sound pressure) and the noise component (noise sound pressure) of the input voice data by a predetermined algorithm.

Then, the voice-data processing unit 211 estimates a noise factor from the characteristics of the noise component (step S005). Specifically, the voice-data processing unit 211 estimates the factor of the noise based on the characteristics of the waveform of the noise component by a method of similarity comparison of patterns or the like.

Then, the task estimation unit 212 estimates one or more tasks, calculates the reliability of each task, and estimates the decreasing factor of the reliability (step S006). Specifically, the task estimation unit 212 calculates the reliability of the estimated task using the S/N ratio of the voice input (the ratio of the utterance sound pressure and the noise sound pressure), the traveling speed of the vehicle, and the reliability-decreasing-factor ratio of the vehicle-environment information. Then, when the calculated reliability is equal to or less than a predetermined threshold value, the task estimation unit 212 specifies, as the reliability decreasing factor, factors in which the S/N ratio of the voice input (the ratio of the utterance sound pressure and the noise sound pressure), the traveling speed of the vehicle, or the reliability-decreasing-factor ratio of the vehicle-environment information is lower than each predetermined threshold. Then, the task estimation unit 212 inquires of the task-estimation-result-history management unit 113 of the on-vehicle device 100 and acquires the factor, in which the factor relevant flag 122C is "No", stored in the reliability-decreasing-factor storage unit 122. Then, the task estimation unit 212 excludes the factor in which the factor relevant flag 122C is "No" from the factors lower than the predetermined threshold values, and estimates the other factors as the reliability decreasing factors.

Then, the task estimation unit 212 excludes the misrecognition result in the history from the estimated tasks (step S007). Specifically, the task estimation unit 212 recognizes the utterance corresponding to the estimated task estimated in step S006, and then excludes the estimated task determined to be incorrect by the user's confirmation from the estimated tasks. The task estimation unit 212 further inquires of the task-estimation-result-history management unit 113 of the on-vehicle device 100 and acquires the factors that are the estimated tasks, in which the misrecognition flag 121D is "Y", stored in the task-estimation-result-history storage unit 121. Then, the task estimation unit 212 excludes the task in which the misrecognition flag 121D is "Y" from the estimated tasks, and determines the other tasks as the estimated tasks.

Then, the user-confirmation-necessity determination unit 213 determines whether the reliability of the estimated task having the highest reliability among the estimated tasks is equal to or less than a predetermined value (step S008). As a result of the determination, when the reliability of the estimated task having the highest reliability is not equal to or less than the predetermined value, the control is performed to proceed to step S011 to be described later.

When the reliability of the estimated task having the highest reliability among the estimated tasks is equal to or less than the predetermined value (in the case of "Yes" in step S008), the task-estimation-result-history management unit 113 of the on-vehicle device 100 stores the estimation result in the history, and the output control unit 115 displays a task confirmation screen (step S009). Specifically, first, the user-confirmation-necessity determination unit 213 transmits the estimated task having the highest reliability, the reliability thereof, and the reliability decreasing factor thereof to the on-vehicle device 100, and the task-estimation-result-history management unit 113 stores the estimated task and the reliability thereof in the task-estimation-result-history storage unit 121 and the reliability decreasing factor in the reliability-decreasing-factor storage unit 122, and sets the factor relevant flag 122C to "Yes". Then, the task-estimation-result-history management unit 113 instructs the output control unit 115 to display the task confirmation screen. Then, when accepting an instruction for re-utterance from the user, the output control unit 115 performs the guidance about the coping method for the reliability decreasing factor with the voice output unit 114, and the control is performed to return to step S001. In the processing, the task-estimation-result-history management unit 113 sets the misrecognition flag 121D of the estimated task to "Y".

When accepting the confirmation of the estimated task on the task confirmation screen, the output control unit 115 notifies the server device 200 of the confirmed task (step S010). Specifically, when accepting an instruction positively affirming the estimated task, or when a predetermined time (for example, 5 seconds) elapses without performing any operation, the output control unit 115 determines that the estimated task is confirmed, and transmits the fact to the server device 200.

Then, the task processing unit 214 starts the confirmed task or the estimated task having the highest reliability (step S011). Specifically, the task processing unit 214 compares the confirmed estimated task or the task having the reliability equal to or higher than the predetermined value with the start keyword 221C of the task storage unit 221, and allocates and executes the corresponding execution task 221B.

Then, the task processing unit 214 transmits the task output (step S012). Specifically, the task processing unit 214 transmits the output information on the task started in step S011 to the on-vehicle device 100.

Then, the output control unit 115 deletes the content of the task-estimation-result-history storage unit 121 and the reliability-decreasing-factor storage unit 122, and displays the task output (step S013).

The above is the procedure of the task execution processing. According to the task execution processing, it is possible to interpret the content instructed in voice and directly execute the task if the reliability of the estimated task is equal to or higher than a predetermined value, or otherwise it is possible to execute a confirmed task by confirming a task to be executed and prompting re-utterance or execution confirmation. Furthermore, at that time, it is possible to offer the user concrete measures by performing voice guidance about the coping method for the reliability decreasing factor.

Figure 8:
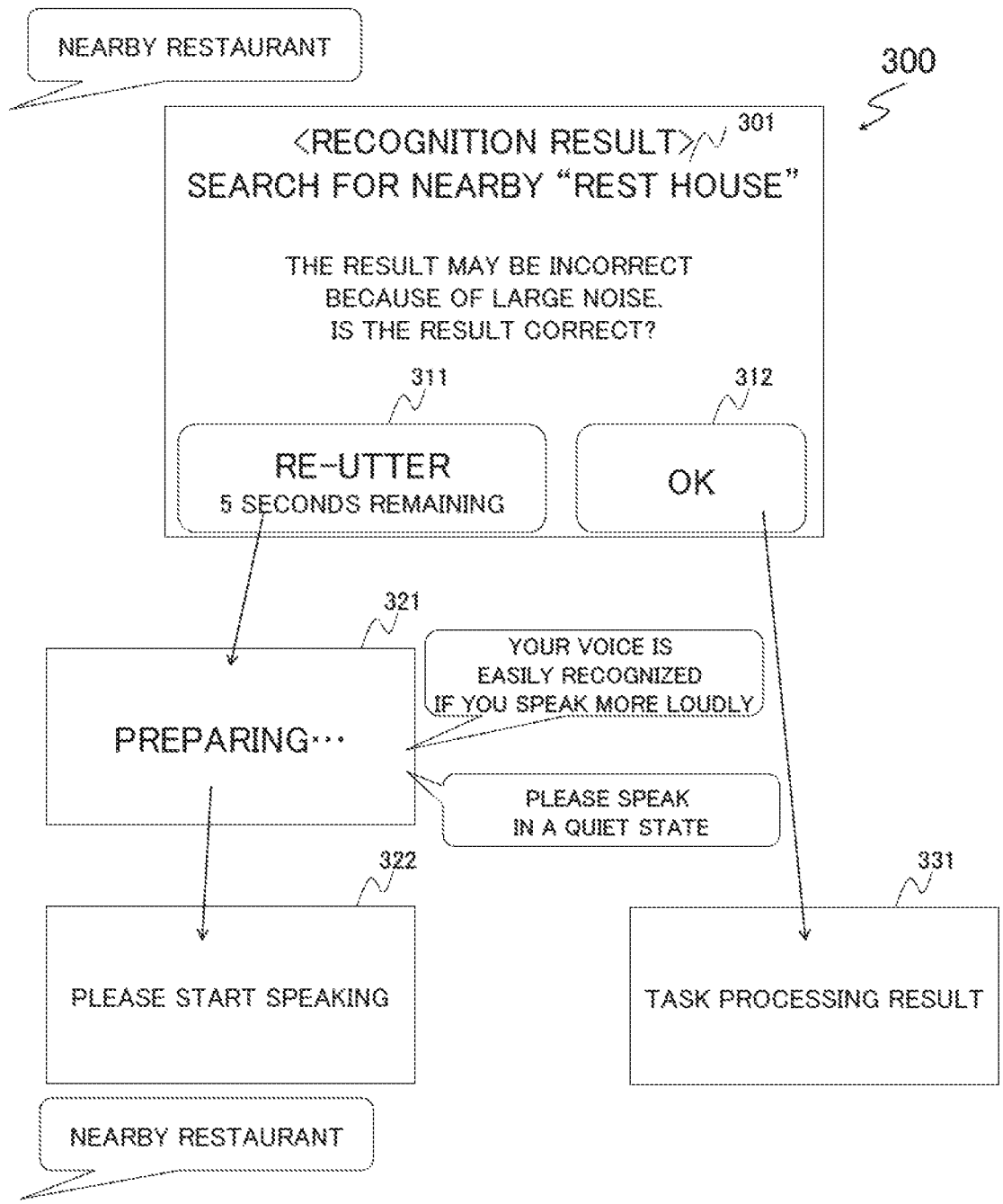
FIG. 8 is a diagram showing a first example of screen output of the task execution processing.

FIG. 8 is a diagram showing a first example of screen output of the task execution processing. A first example 300 of the output screen of the task execution processing is an example of a screen displayed on the on-vehicle device 100 when the reliability is equal to or less than a predetermined value. In the first example 300 of the output screen of the task execution processing, an estimation result display area 301 for displaying an estimated task as a result of voice recognition and a reliability decreasing factor, and a re-utterance button 311 for accepting an instruction for re-utterance, and an OK button 312 for accepting the confirmation of the estimated task are displayed. In addition, on the re-utterance button 311, the time limit for accepting the re-utterance instruction is displayed. Here, when an instruction to the OK button 312 is accepted or when a predetermined time limit expires without any instruction, the task is executed and a task processing result screen 331 as the result is displayed.

When accepting an instruction to the re-utterance button 311, a preparing screen 321 is displayed, and at that time, a coping method according to the reliability decreasing factor is guided in voice. For example, the guidance such as "Your voice is easily recognized if you speak more loudly." (when the utterance sound pressure is low) or "Please speak in a quiet state." (when the S/N ratio is low) is performed according to the reliability decreasing factor.

When the guidance is finished, an utterance screen 322 for accepting an utterance is displayed until the user ends the utterance.

Figure 9:
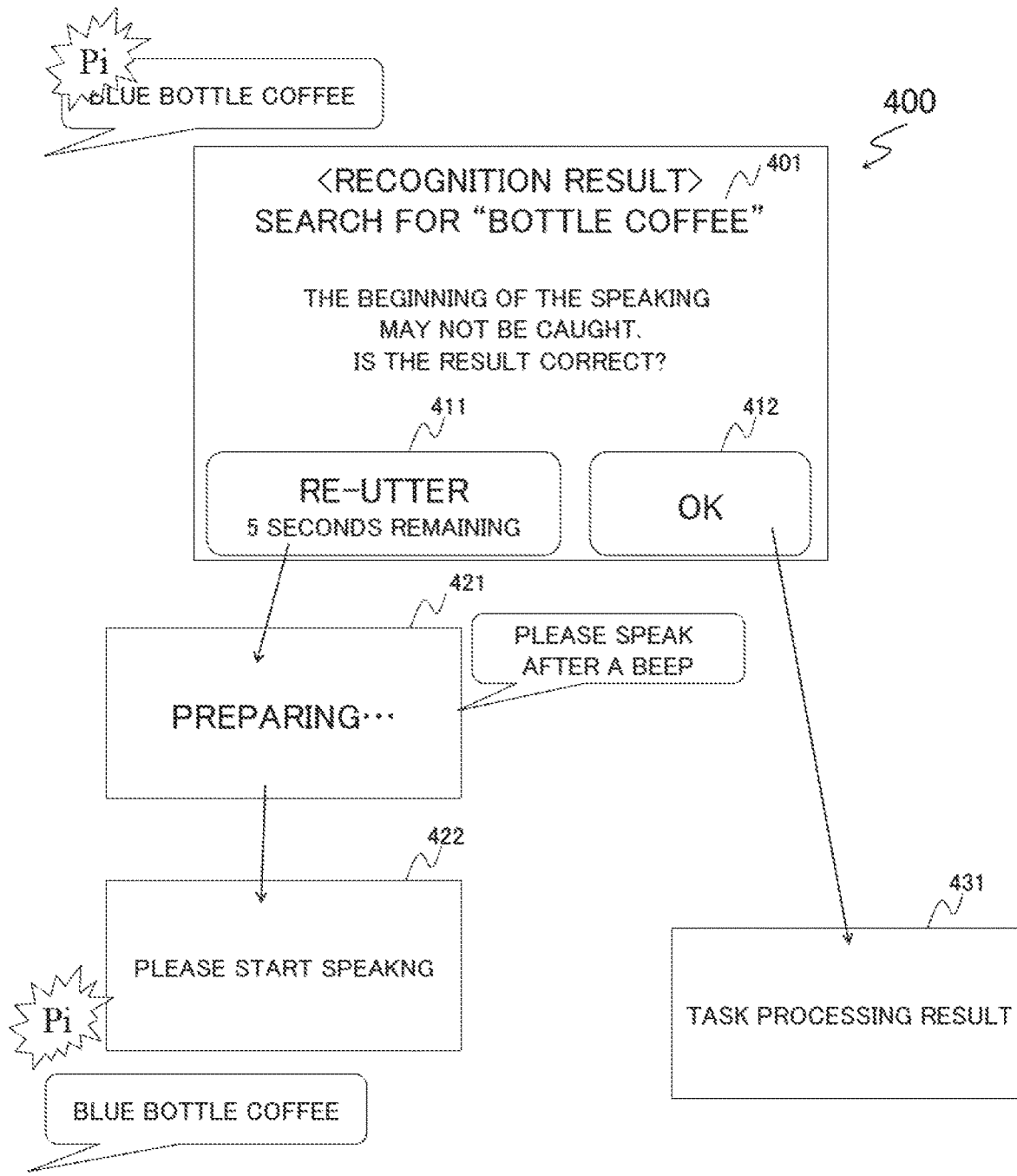
FIG. 9 is a diagram showing a second example of screen output of the task execution processing.

FIG. 9 is a diagram showing a second example of screen output of the task execution processing. A second example 400 of the output screen of the task execution processing is an example of a screen displayed on the on-vehicle device 100 when the reliability is equal to or less than a predetermined value. In the second example 400 of the output screen of the task execution processing, an estimation result display area 401 for displaying an estimated task as a result of voice recognition and a reliability decreasing factor, and a re-utterance button 411 for accepting an instruction for re-utterance, and an OK button 412 for accepting the confirmation of the estimated task are displayed. In addition, on the re-utterance button 411, the time limit for accepting the re-utterance instruction is displayed. Here, when an instruction to the OK button 412 is accepted or when a predetermined time limit expires without any instruction, the task is executed and a task processing result screen 431 as the result is displayed.

When accepting an instruction to the re-utterance button 411, a preparing screen 421 is displayed, and at that time, a coping method according to the reliability decreasing factor is guided in voice. For example, the guidance such as "Please speak after a beep." (when the sound pressure at the beginning of acceptance of the utterance input is already equal to or higher than a predetermined value) is performed according to the reliability decreasing factor.

When the guidance is finished, an utterance screen 422 for accepting an utterance is displayed until the user ends the utterance.

The above is the voice operating system according to the first embodiment. According to the first embodiment, it is possible to easily perform accurate voice recognition.

However, the present invention is not limited to the above embodiment. The first embodiment described above can be variously modified within the scope of the technical idea of the present invention.

Figure 10:
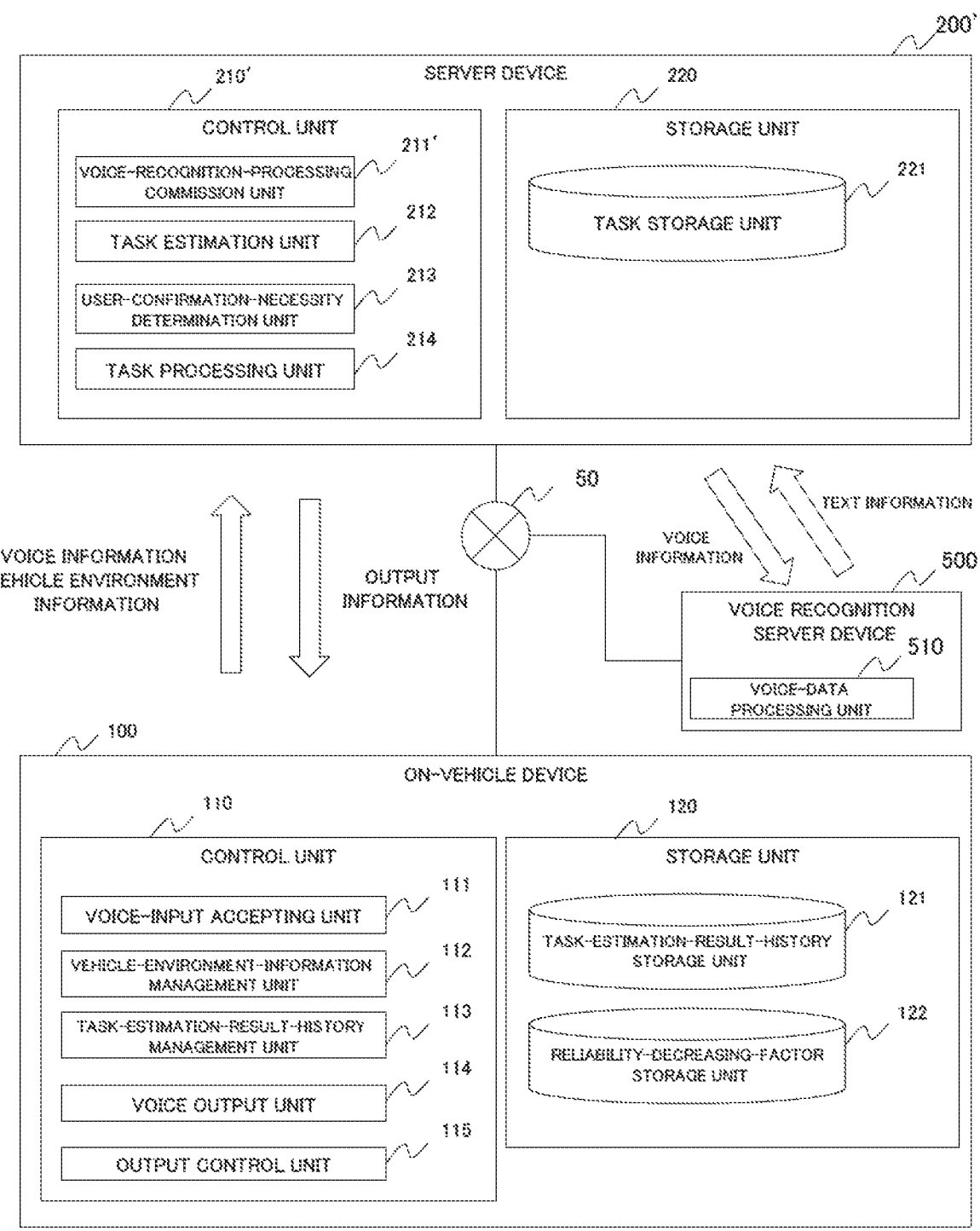
FIG. 10 is a diagram showing a configuration of a voice operating system according to a second embodiment.

FIG. 10 is a diagram showing a configuration of a voice operating system according to a second embodiment. The voice operating system according to the second embodiment basically has the same configuration as that in the first embodiment, but has some differences. The differences will be mainly described below.

In the voice operating system according to the second embodiment, a server device 200' includes a control unit 210'. The control unit 210' includes a voice-recognition-processing commission unit 211' instead of the voice-data processing unit 211. The voice-recognition-processing commission unit 211' transmits the received voice information to a voice recognition server device 500, and acquires the character string of the content of the utterance.

The voice recognition server device 500 is a server device connected to a network 50. The voice recognition server device 500 includes a voice-data processing unit 510. The voice-data processing unit 510 converts the input voice data into the character string of the utterance content. The voice-data processing unit 510 further estimates the magnitude of the signal component (utterance sound pressure) and the noise component (noise sound pressure) of the voice information. The voice-data processing unit 510 further estimates the factor of the noise based on the characteristics of the waveform of the noise component by a method of similarity comparison of patterns or the like.

The above is the configuration of the voice operating system according to the second embodiment. In the voice operating system according to the second embodiment, voice data processing such as voice recognition is delegated to the voice recognition server device 500 which is a different device from the server device 200'. Thus, it becomes possible to lower the processing load of the server device 200' and to easily use higher versatile voice recognition processing and the like provided by an external organization, which makes the flexibility of the system configuration variation and extension of the scale easy, and the improvement of accuracy and ease of management can be thereby expected.

Furthermore, the voice operating system according to the present invention is not limited to the first and second embodiments described above, and can be variously modified within the scope of the technical idea of the present invention. For example, the voice guidance in step S009 of the task execution processing is not limited to the guidance described in the first embodiment, and can be variously modified. Specifically, when the estimated value of the utterance sound pressure is smaller than a predetermined threshold value, the volume of the notification voice may be output larger than a predetermined volume. With this modification, it is possible for the notification to be heard easily and to induce the user to speak loudly influenced by the volume.

In addition, when the estimated value of the noise sound pressure is larger than a predetermined threshold value of the noise sound pressure, the user may be prompted to perform operation by touching, or with a remote controller or a hard button instead of performing the voice input by re-utterance. This is to avoid repeated misrecognition of re-utterance, since it is assumed that the utterer is in a noisy environment.

Furthermore, regarding the calculation of the reliability, for example, a predetermined point may be added when the threshold value of a predetermined S/N is smaller than the estimated value of the S/N of the voice data, or when the vehicle speed at the time of utterance is smaller than a threshold value of a predetermined vehicle speed. Alternatively, points may be added according to the degree of the condition of the vehicle-environment information satisfying a predetermined condition. Naturally, the reliability may be calculated according to points obtained by combining these. With this modification, it is possible to optimize the calculation standard of the reliability.

The present invention has been described above with reference to the embodiments. However, the present invention is not limited to these, and the characteristic processing described in the above embodiments can be applied to other devices (for example, to a mobile terminal such as a detachable navigation device as well as the on-vehicle device 100).

REFERENCE SIGNS LIST

50 Network
100 On-vehicle device
110 Control unit
111 Voice-input accepting unit
112 Vehicle-environment-information management unit
113 Task-estimation-result-history management unit
114 Voice output unit
115 Output control unit
120 Storage unit
121 Task-estimation-result-history storage unit
122 Reliability-decreasing-factor storage unit
200 Server device
210 Control unit
211 Voice-data processing unit
212 Task estimation unit
213 User-confirmation-necessity determination unit
214 Task processing unit
220 Storage unit
221 Task storage unit

The invention claimed is:

1. A voice operating system comprising: an on-vehicle device; and a server device capable of communicating with the on-vehicle device, wherein
the on-vehicle device comprises:
a voice-input accepting unit configured to accept input information in voice;
a vehicle-environment-information management unit configured to acquire vehicle-environment information specifying an environment of a vehicle provided with the on-vehicle device; and
an output control unit configured to transmit the input information and the vehicle-environment information to the server device, then output an execution task candidate received from the server device together with an estimated misrecognition factor of voice recognition, and transmit, when accepting execution permission of the execution task candidate, an instruction to execute the execution task candidate to the server device, and
the server device comprises:
a voice-data processing unit configured to convert, when accepting the input information and the vehicle-environment information from the on-vehicle device, the input information into a character string;
a task estimation unit configured to specify the execution task candidate corresponding to the character string into which the voice-data processing unit converts the input information, reliability using the input information and the vehicle-environment information, and the estimated misrecognition factor if any;
a user-confirmation-necessity determination unit configured to transmit, when the reliability is less than a predetermined value, the estimated misrecognition factor of the voice recognition and the execution task candidate to the on-vehicle device; and
a task processing unit configured to execute the execution task candidate;
wherein
the on-vehicle device further comprises
a task-estimation-result-history management unit configured to manage a history of the execution task candidate,
the task-estimation-result-history management unit stores the execution task candidate received by the output control unit, and
the task estimation unit excludes
the execution task candidate stored in the task-estimation-result-history management unit in processing for specifying the execution task candidate.

2. The voice operating system according to claim 1, wherein
the output control unit notifies in voice, when accepting a re-input instruction for the execution task candidate, a coping method for the estimated misrecognition factor of the voice recognition, and causes the voice-input accepting unit to accept input information in voice.

3. The voice operating system according to claim 1, wherein
the on-vehicle device comprises
a reliability-decreasing-factor storage unit configured to store a history of the estimated misrecognition factor of the voice recognition received by the output control unit,
the task-estimation-result-history management unit stores the estimated misrecognition factor of the voice recognition received by the output control unit, and
the task estimation unit excludes
the estimated misrecognition factor of the voice recognition stored in the reliability-decreasing-factor storage unit in processing for specifying the estimated misrecognition factor.

4. The voice operating system according to claim 1, wherein
the output control unit notifies in voice, when accepting a re-input instruction for the execution task candidate, a coping method for the estimated misrecognition factor of the voice recognition, and causes the voice-input accepting unit to accept input information in voice, and notifies, when an utterance sound pressure of the input information in voice previously accepted by the voice-input accepting unit is smaller than a predetermined sound pressure, the coping method by increasing a volume to be equal to or larger than a predetermined sound volume in the processing.

5. The voice operating system according to claim 1, wherein
the output control unit notifies in voice, when accepting a re-input instruction for the execution task candidate, a coping method for the estimated misrecognition factor of the voice recognition, and causes the voice-input accepting unit to accept input information in voice, and stops, when a noise sound pressure of the input information in voice previously accepted by the voice-input accepting unit is larger than a predetermined sound pressure, accepting the input information in voice in the processing.

6. A server device capable of communicating with a predetermined on-vehicle device, the server device comprising:
a voice-data processing unit configured to convert, when accepting input information in voice and vehicle-environment information specifying an environment of a vehicle provided with the on-vehicle device from the on-vehicle device, the input information into a character string;
a task estimation unit configured to specify an execution task candidate corresponding to the character string into which the voice-data processing unit converts the input information, reliability using the input information and the vehicle-environment information, and an estimated misrecognition factor if any;
a user-confirmation-necessity determination unit configured to transmit, when the reliability is less than a predetermined value, the estimated misrecognition factor of voice recognition and the execution task candidate to the on-vehicle device; and
a task processing unit configured to execute the execution task candidate,
wherein the task estimation unit inquires of the on-vehicle device a history of the execution task candidate received by the on-vehicle device and excludes the execution task candidate of the history in processing for specifying the execution task candidate.

7. A voice operating method for a voice operating system comprising an on-vehicle device and a server device capable of communicating with the on-vehicle device, wherein
the on-vehicle device comprises a control unit,
the control unit executes:
a voice-input accepting step of accepting input information in voice;
a vehicle-environment-information management step of acquiring vehicle-environment information specifying an environment of a vehicle provided with the on-vehicle device; and
an output control step of transmitting the input information and the vehicle-environment information to the server device, then outputting an execution task candidate received from the server device together with an estimated misrecognition factor of voice recognition, and transmitting, when accepting execution permission of the execution task candidate, an instruction to execute the execution task candidate to the server device,
the server device comprises a server control unit, and
the server control unit executes:
a voice-data processing step of converting, when accepting the input information and the vehicle-environment information from the on-vehicle device, the input information into a character string;
a task estimation step of specifying the execution task candidate corresponding to the character string into which the input information is converted in the voice-data processing step, reliability using the input information and the vehicle-environment information, and the estimated misrecognition factor if any;
a user-confirmation-necessity determination step of transmitting, when the reliability is less than a predetermined value, the estimated misrecognition factor of the voice recognition and the execution task candidate to the on-vehicle device; and
a task processing step of executing the execution task candidate;
wherein
the on-vehicle device comprises
a task-estimation-result-history management unit configured to manage a history of the execution task candidate,
the task-estimation-result-history management unit stores the execution task candidate received by the output control unit, and
the task estimation unit excludes
the execution task candidate stored in the task-estimation-result-history management unit in processing for specifying the execution task candidate.

8. A voice operating system comprising: an on-vehicle device; and a server device capable of communicating with the on-vehicle device, wherein
the on-vehicle device comprises:
a voice-input accepting unit configured to accept input information in voice;
a vehicle-environment-information management unit configured to acquire vehicle-environment information specifying an environment of a vehicle provided with the on-vehicle device; and
an output control unit configured to transmit the input information and the vehicle-environment information to the server device, then output an execution task candidate received from the server device together with an estimated misrecognition factor of voice recognition, and transmit, when accepting execution permission of the execution task candidate, an instruction to execute the execution task candidate to the server device, and
the server device comprises:
a voice-data processing unit configured to convert, when accepting the input information and the vehicle-environment information from the on-vehicle device, the input information into a character string;
a task estimation unit configured to specify the execution task candidate corresponding to the character string into which the voice-data processing unit converts the input information, reliability using the input information and the vehicle-environment information, and the estimated misrecognition factor if any;
a user-confirmation-necessity determination unit configured to transmit, when the reliability is less than a predetermined value, the estimated misrecognition factor of the voice recognition and the execution task candidate to the on-vehicle device; and
a task processing unit configured to execute the execution task candidate, wherein
the on-vehicle device comprises
a reliability-decreasing-factor storage unit configured to store a history of the estimated misrecognition factor of the voice recognition received by the output control unit,
the task-estimation-result-history management unit stores the estimated misrecognition factor of the voice recognition received by the output control unit, and
the task estimation unit excludes
the estimated misrecognition factor of the voice recognition stored in the reliability-decreasing-factor storage unit in processing for specifying the estimated misrecognition factor.

* * * * *